(12) United States Patent
Eiermann et al.

(10) Patent No.: US 6,669,276 B2
(45) Date of Patent: Dec. 30, 2003

(54) SLIDING ROOF SYSTEM

(75) Inventors: Michael Eiermann, Pfungstadt (DE); Klaus-Peter Hoffmann, Bad Triburg (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/228,028

(22) Filed: Aug. 26, 2002

(65) Prior Publication Data

US 2003/0038513 A1 Feb. 27, 2003

(30) Foreign Application Priority Data

Aug. 27, 2001 (DE) .......................................... 101 41 845

(51) Int. Cl.⁷ ................................................ B60J 7/043
(52) U.S. Cl. .................................. 296/216.02; 296/223
(58) Field of Search ........................ 296/216.01–216.05, 296/220.01, 221–223

(56) References Cited

U.S. PATENT DOCUMENTS

| | | | |
|---|---|---|---|
| 4,602,815 A | | 7/1986 | Boots et al. |
| 5,026,113 A | * | 6/1991 | DiCarlo et al. ............. 296/221 |
| 5,069,501 A | | 12/1991 | Baldwin et al. |
| 5,718,472 A | * | 2/1998 | Otake et al. ................. 296/221 |
| 5,746,475 A | * | 5/1998 | Caye et al. ................... 296/223 |
| 6,416,122 B1 | * | 7/2002 | Schwarz et al. ........ 296/220.01 |

FOREIGN PATENT DOCUMENTS

| | | |
|---|---|---|
| DE | 40 05 790 C2 | 10/1992 |
| DE | 100 37 035 A1 | 2/2002 |
| EP | 0 371 523 A | 6/1990 |
| EP | 1 052 126 A1 | 11/2000 |

OTHER PUBLICATIONS

German Search Report, dated Apr. 15, 2003.
European Search Report, dated May 13, 2003.

* cited by examiner

*Primary Examiner*—Dennis H. Pedder
(74) *Attorney, Agent, or Firm*—Carlson, Gaskey & Olds

(57) ABSTRACT

A sliding roof system for a motor vehicle comprises at least one cover part and a cover support to which the cover part is mounted. The system further comprises a guide rail on which a hook-out slot is provided and a carriage which can be shifted in the guide rail. An adjustment slot is provided on the carriage and is engaged by a hook-out pin which is mounted to the cover support. The hook-out pin also engages in the hook-out slot. A guide slot is provided on the guide rail and a guide pin is provided on the cover support, the guide pin gliding in the guide slot.

4 Claims, 7 Drawing Sheets

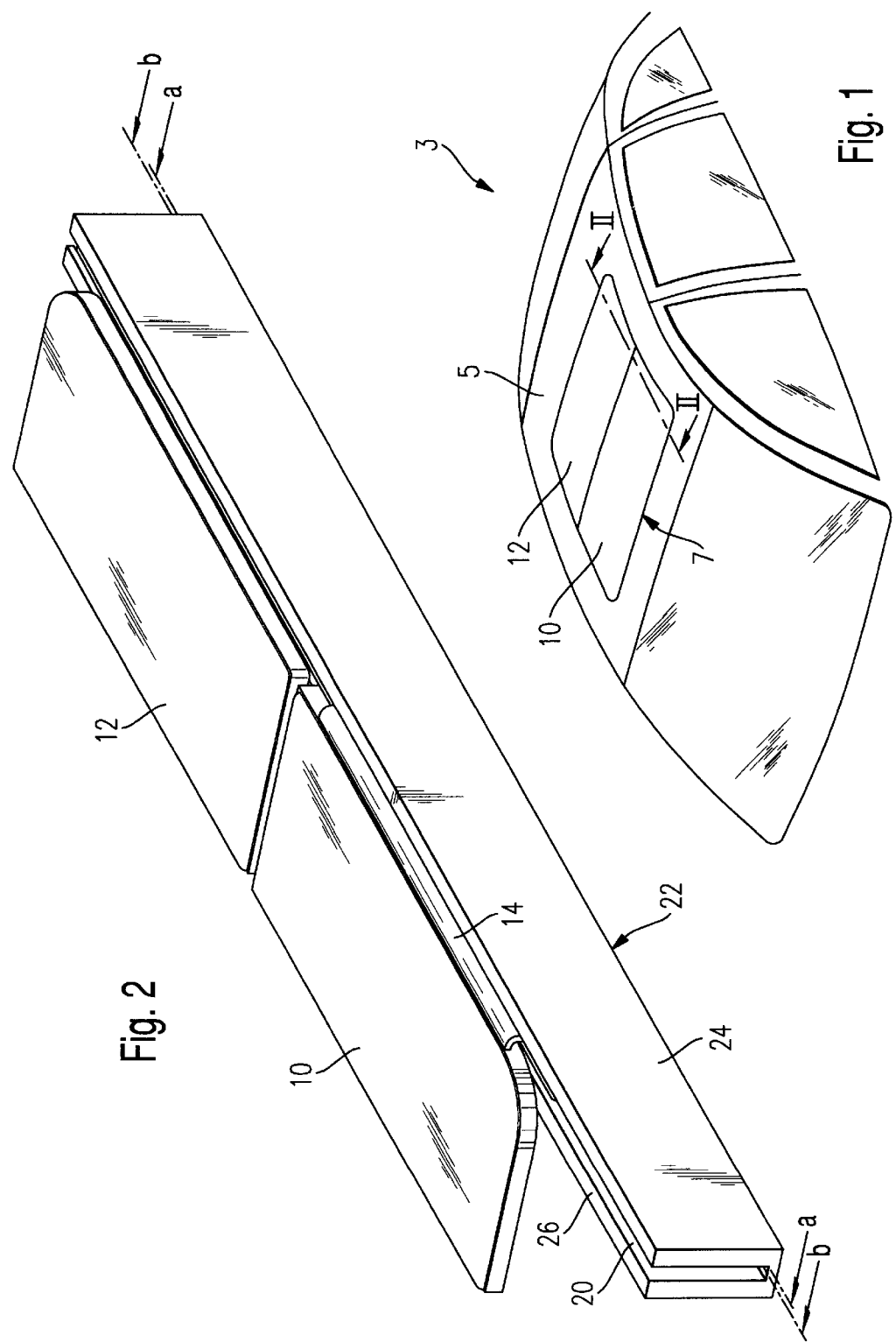

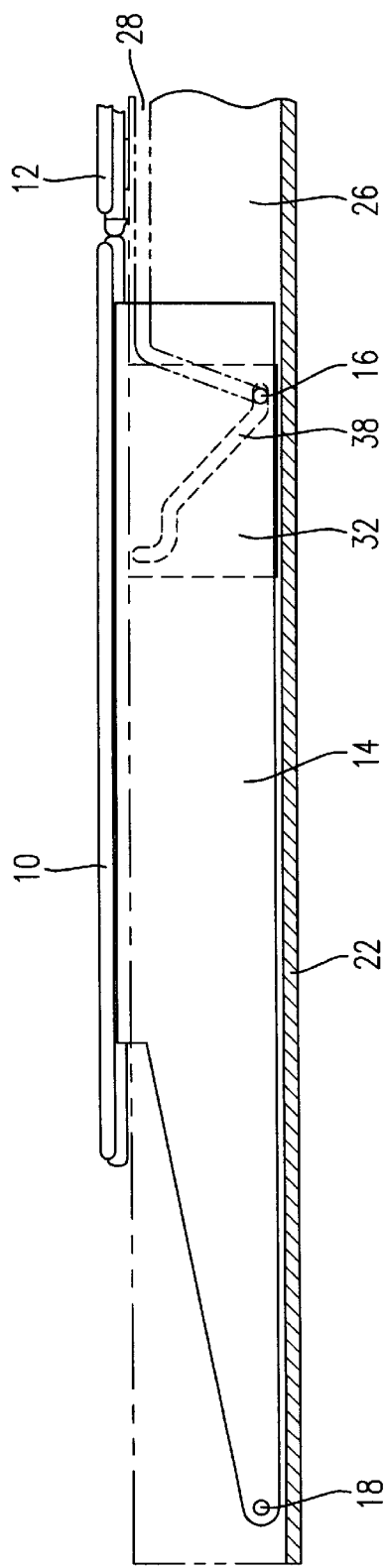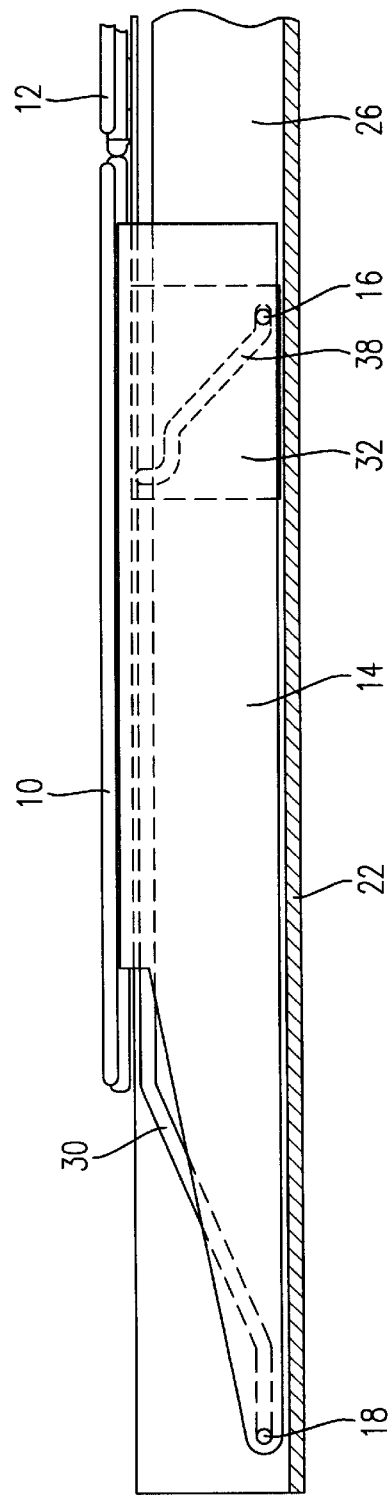
Fig. 5a
Fig. 5b

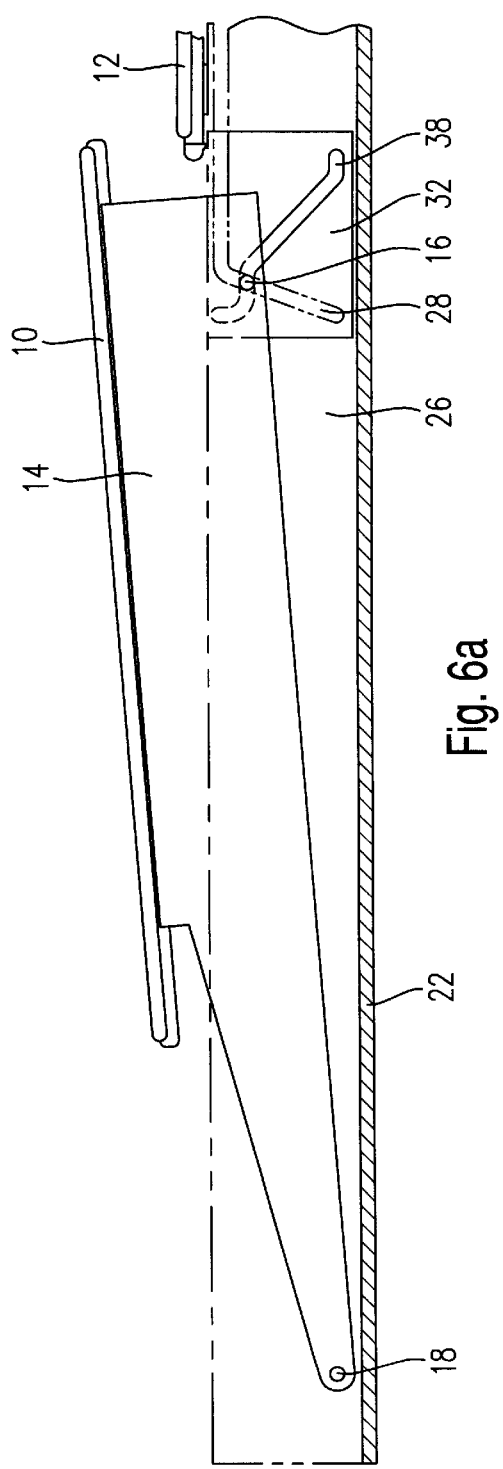
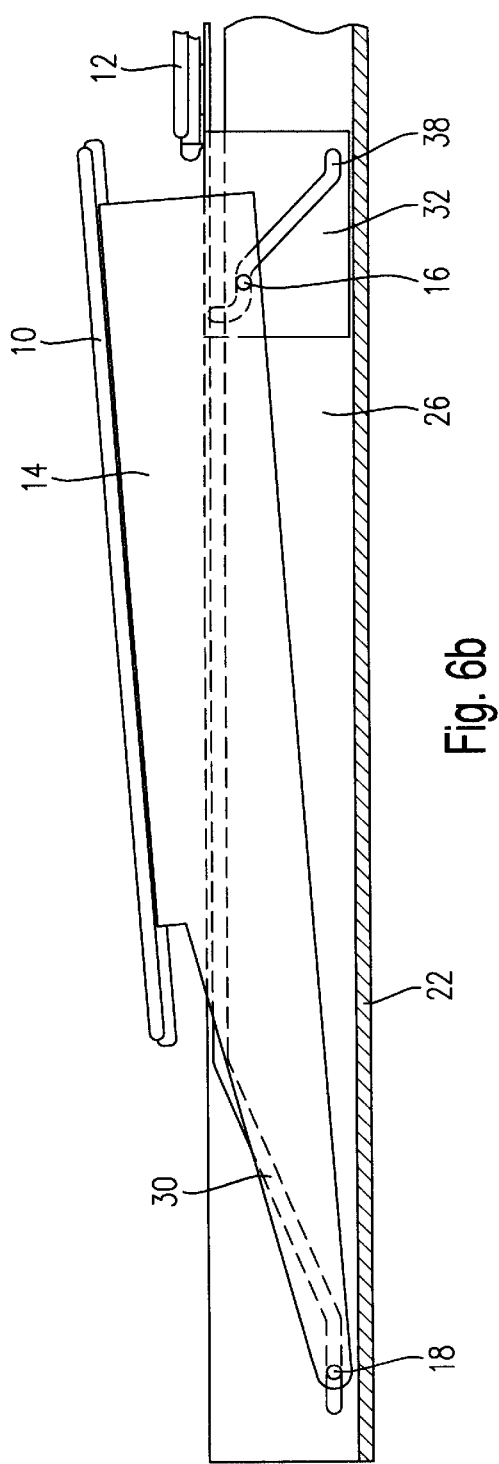

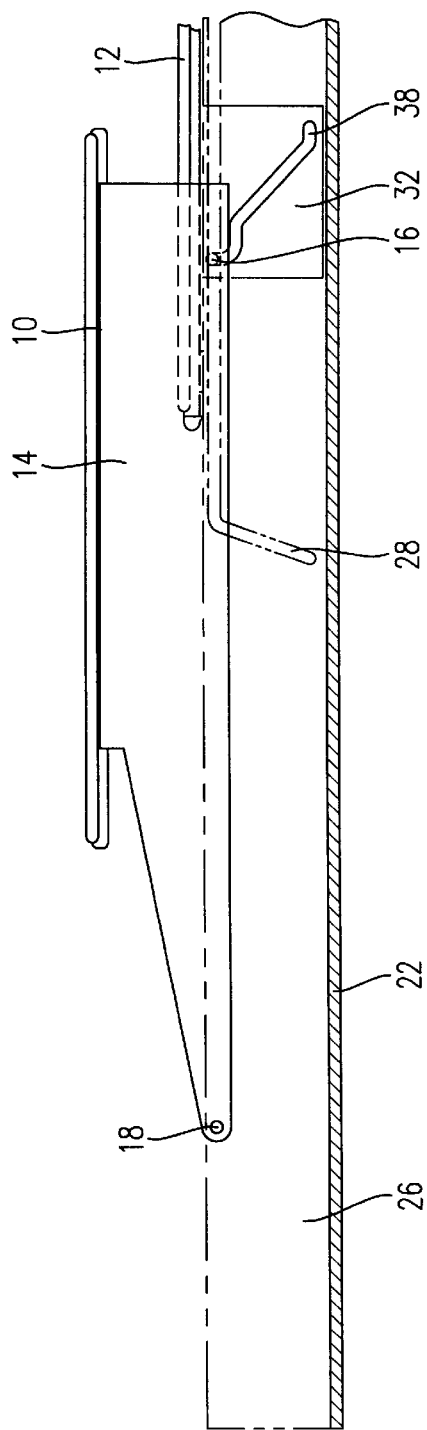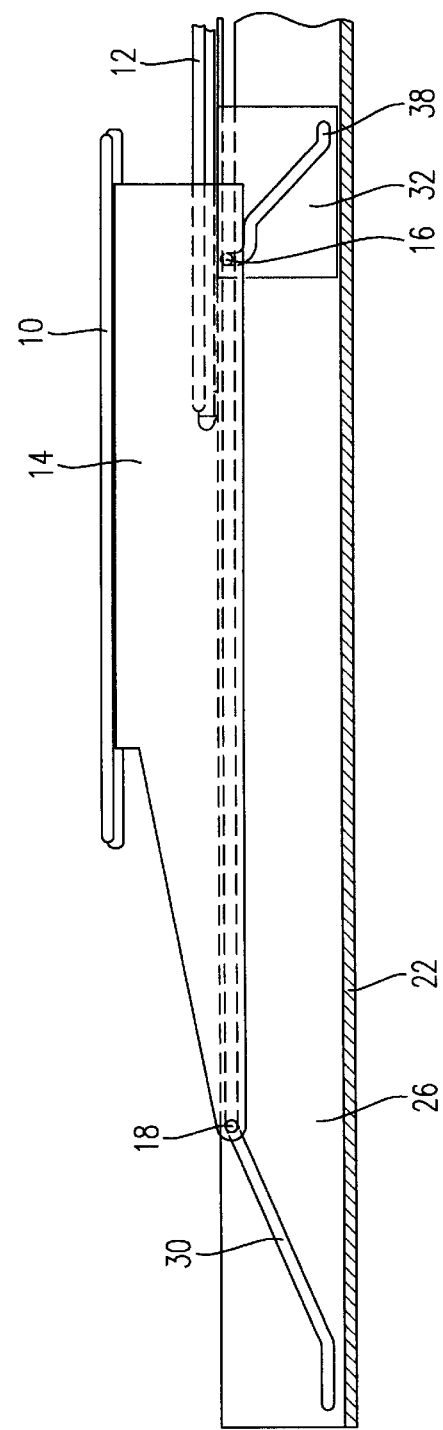

SLIDING ROOF SYSTEM

This application claims priority to German patent application number 101 41 845.0 filed Aug. 27, 2001.

The invention relates to a sliding roof system for a motor vehicle, comprising at least one cover part, a cover support to which the cover part is mounted, a guide rail on which a hook-out slot is provided and a carriage which can be shifted in the guide rail, an adjustment slot being provided on the carriage and engaged by a hook-out pin which is mounted to the cover support, the hook-out pin also engaging in the hook-out slot.

Such a sliding roof system is known from European Patent EP 0 693 996. In this known system, the hook-out pin mounted to the cover support is associated to the front edge of the cover part, as seen in the direction of travel. Provided on a second cover support, which is mounted to said cover part approximately in the middle thereof, is a second slot which is engaged by a pin mounted to the carriage. The position of the cover part results on the one hand from the position of the hook-out pin in relation to the carriage, this position being determined by the point of intersection between the adjustment slot on the carriage and the hook-out slot in the guide rail, and results on the other hand from the position of the pin on the carriage in the slot of the second cover support.

A disadvantage of this system is, for one thing, that the carriage is comparably long. For reasons of stability, there has to be a specific minimum distance between the hook-out pin on the first cover support and the pin on the carriage, which engages in the second cover support. As both the hook-out pin on the first cover support and the slot in the second cover support cooperate with the carriage, the latter must have an appropriately large length as a consequence. Secondly, it is a disadvantage that the use of two slotted guides, by means of which the two cover parts are connected with the carriage, requires in combination with the hook-out slot formed in the guide rail to keep to particularly narrow tolerances if on the one hand jamming of the entire mechanism and, on the other, a generation of noise by rattling are to be prevented.

It is the object of the invention to further develop the known sliding roof system to the effect that a shorter overall length can be achieved together with lower demands to the tolerances that have to be kept to.

SUMMARY OF THE INVENTION

According to the invention, a sliding roof system for a motor vehicle comprises at least one cover part and a cover support to which the cover part is mounted. The system further comprises a guide rail on which a hook-out slot is provided and a carriage which can be shifted in the guide rail. An adjustment slot is provided on the carriage and is engaged by a hook-out pin which is mounted to the cover support. The hook-out pin also engages in the hook-out slot. A guide slot is provided on the guide rail and a guide pin is provided on the cover support, the guide pin gliding in the guide slot. With this design, one single slotted guide is used between the cover part and the carriage, i.e. the slotted guide made up of the adjustment slot and the hook-out pin. This connection between the carriage and the cover support preferably lies in the region of the rear edge of the cover part. The second connection between the cover support and the guide rail is ensured by the guide slot in the guide rail, which is engaged by the guide pin on the cover support. For achieving maximum stability, the guide pin may be arranged on the cover support outside the cover part in front of the front edge thereof. This is possible without any problems and without the need of configuring the carriage with a corresponding length, because in the design according to the invention the second point of connection between cover support and guide rail does not cooperate with the carriage. The requirements on the tolerances that have to be kept to are comparably small. The cover support itself does not comprise a slot whatsoever. The two pins provided on the cover support, namely the hook-out pin and the guide pin, can be precisely positioned relative to each other without great problems. The two slots provided in the guide rail, namely the hook-out slot and the guide slot, may likewise be precisely positioned relative to each other without great problems since they are provided on one and the same component.

Advantageous designs of the invention will be apparent from the subclaims.

BRIEF DESCRIPTION OF THE DRAWINGS

FIG. 1 shows in a schematic view a vehicle roof including a sliding roof system;

FIG. 2 shows a schematic, perspective view along plane II—II of FIG. 1;

FIGS. 5a and 5b show the sliding roof system of FIG. 2 in a section along plane a—a and b—b of FIG. 2 in a closed position, respectively;

FIGS. 6a and 6b show the sliding roof system of FIGS. 5a and 5b in a ventilation position;

FIGS. 7a and 7b show the sliding roof system of FIGS. 5a and 5b in a partially opened position.

DETAILED DESCRIPTION OF THE PREFERRED EMBODIMENTS

Figure 3:
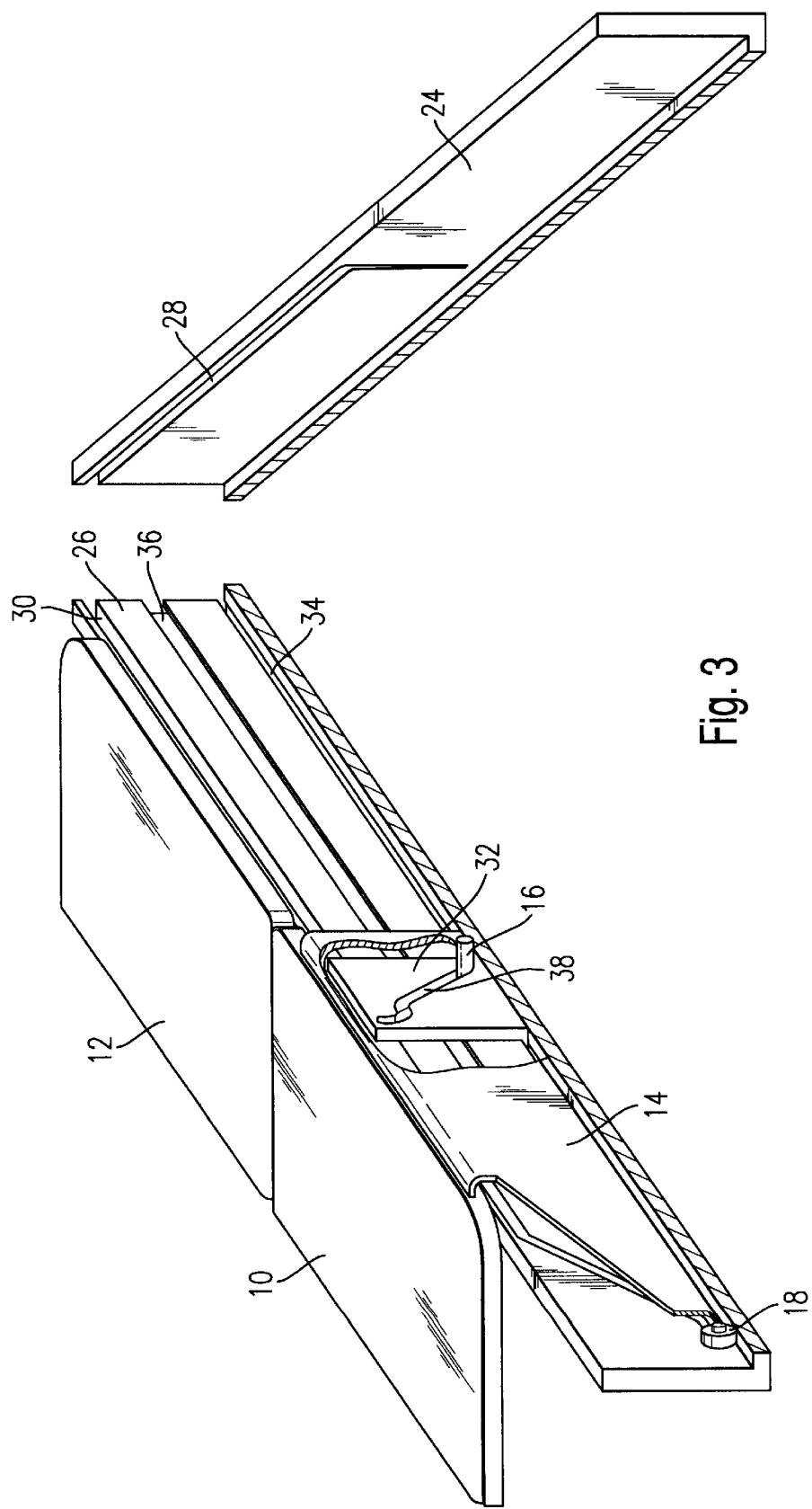
FIG. 3 shows a perspective view with broken portions of the sliding roof system of FIG. 2, the guide rail being cut open along plane b—b of FIG. 2.
Figure 4:
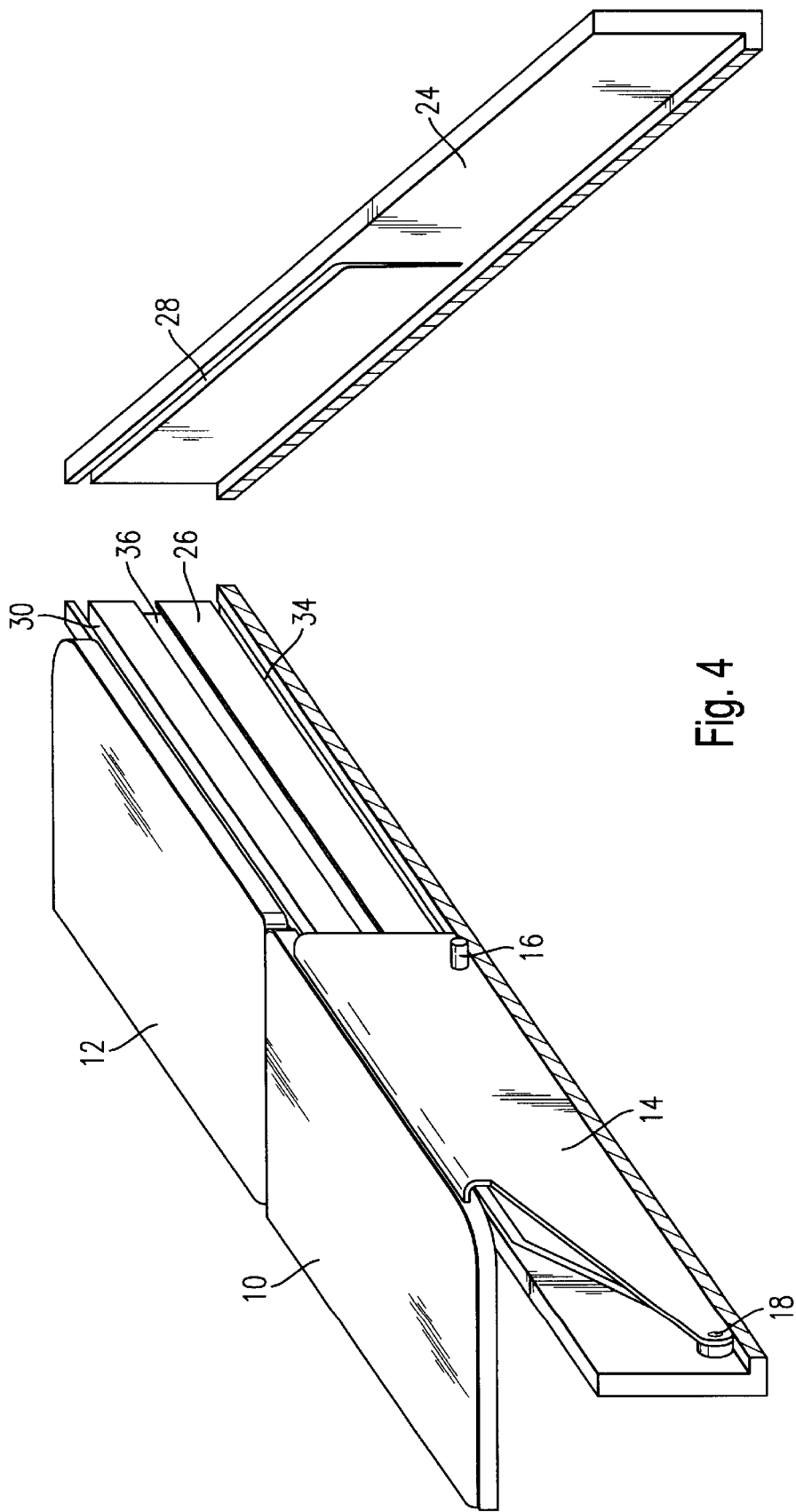
FIG. 4 shows in a view corresponding to that of FIG. 3 the sliding roof system with the cover support being shown in closed state.

In FIG. 1 there is schematically shown a vehicle 3 including a vehicle roof 5. Mounted to the vehicle roof 5 is a sliding roof system 7 which has two movable cover parts 10, 12. As an alternative, the second cover part could also be configured so as to be stationary. The mechanism for moving the cover parts will be explained in the following by means of the first cover part 10 which is the front one as seen in the direction of travel. There will only be described one side of the mechanism here, i.e. the left-hand side as seen in the vehicle's direction of travel. The construction of the opposite side is obvious, because the mechanism is mirror-symmetrical.

The cover part 10 is secured to a cover support 14 which here is configured in the nature of a plate which extends at right angles to the cover part 10. A hook-out pin 16 and a guide pin 18 are provided on the cover support 14. The hook-out pin 16 is arranged in the region of the rear end of the cover part 10, as seen in the direction of travel. The guide pin 18 is arranged at a large distance from the hook-out pin 16, that is to say so far towards the front that it is located in front of the front edge of the cover part 10 (see for instance FIG. 5a), as seen in the direction of travel.

The cover support 14 engages in a guide groove 20 of a U-shaped guide rail 22, this guide groove 20 being made up of two opposing side pieces 24, 26. Formed in the side piece 24 is a hook-out slot 28 which is engaged by the hook-out pin 16. As seen relative to the direction of travel from the front to the rear, the hook-out slot 28 first has a section rising steeply from the bottom of the guide groove 20, and following thereto a straight section extending in parallelism to the direction of extension of the guide rail 22.

A guide slot 30 is formed in the side piece 26 of the guide rail 22, this guide slot 30 being engaged by the guide pin 18 of the cover part 14. The guide slot 30 has, again as seen relative to the vehicle's direction of travel from the front to the rear, first a straight section extending in the vicinity of the bottom of the guide groove 20 and in parallelism to the longitudinal direction of the guide rail 22, this straight section being followed by a straight section extending obliquely upwards which, in turn, is followed by a straight section which extends in parallelism to the longitudinal direction of the guide rail.

A carriage 32 is movably mounted in the guide groove 20 of the guide rail 22. For guiding the carriage, there is provided a groove 34 in the side piece 26 of the guide rail 22. There is further provided a channel 36 in which a (not shown) drive cable for the carriage 32 is arranged. Provided in the carriage is an adjustment slot 38 which is engaged by the hook-out pin 16 on the cover support 14. As seen relative to the direction of travel of the vehicle from the front to the rear, the adjustment slot 38 extends as follows: In a first section the adjustment slot 38 extends vertically from top to bottom; following adjoining thereto is a 90° bend towards the rear, which is followed by a horizontal section extending parallel to the shifting direction of the carriage in the rail. The latter is followed by a straight section extending obliquely downwards at an angle of about 45°, which continues into a short section again extending in horizontal direction to the rear.

The mode of operation of the sliding roof system will be explained in the following by means of FIGS. 5a to 8b. In FIGS. 5a and 5b, the sliding roof system is shown with the first cover part 10 being closed. The guide pin 18 is located at the left end of the guide slot 30, and the hook-out pin 16 is located at the bottom, left end of the hook-out slot 28. The carriage 32 is arranged such that the hook-out pin 16 is located at the right, bottom end of the adjustment slot 38. In this position of the carriage the cover part 10 is securely arrested; a movement in the longitudinal direction of the guide rail, i.e. in direction x, is not possible because the hook-out pin 16 is retained by the adjustment slot 38 in such a way that it can not move in the x-direction in the hook-out slot 28. A movement of the cover part in upward direction, namely in direction z, is likewise not possible, because the hook-out pin 16 is firmly retained in direction z by the horizontally extending section of the adjustment slot 38 and the guide pin 18 is firmly retained in direction z by the horizontally extending section of the guide slot 30.

By moving the carriage 32 to the right with respect to the Figures, the first cover part 10 arrives at the so-called ventilation position shown in FIGS. 6a and 6b. In this position the rear edge of the cover part is lifted. On shifting the carriage 32 to the right, the hook-out pin 16—guided by the obliquely upwards extending section of the adjustment slot 38—is moved in the hook-out slot 28 obliquely upwards and to the rear. The position of the hook-out pin 16 is definitely established at any time, to be more precise on the point of intersection between the adjustment slot 38 in the carriage 32 and the hook-out slot 28 in the side piece 26 of the guide rail 22. The ventilation position of the cover part 10 is reached if the hook-out pin 16 is located in the horizontally extending intermediate section of the adjustment slot 38. As can be seen in FIG. 6b, the guide pin 18 slightly moves to the right in the guide slot 30 during shifting the cover part 10.

Basically, it would also be possible that in the ventilation position of the cover part 10 the hook-out pin 16 is located on an obliquely extending section of the adjustment slot 38. The present design in which the ventilation position is determined by reaching a horizontally extending section of the adjustment slot 38, however, has the advantage that the level of the cover part 10 in the ventilation position is defined very precisely, without the need of precisely keeping to a position of the carriage 32 in the x-direction; the possible range of tolerance corresponds to the length of the horizontally extending intermediate section of the adjustment slot 38. In addition, the sliding roof system in the present design is self-locking if the ventilation position is reached; any loads in z-direction which act on the cover part will not generate forces that act on the carriage 32 in the x-direction.

If starting from the position shown in FIGS. 6a and 6b the carriage 32 is moved further to the right, the intermediate position shown in FIGS. 7a and 7b will be reached. In this intermediate position, the first cover part 10 has just reached its maximum hooked-out position, because the guide pin 18 is located at the transition from the obliquely extending section of the guide slot 30 to the horizontally extending section situated at the top. The hook-out pin 16 is already located in the top, horizontally extending section of the hook-out slot 28 as well as at the top end of the adjustment slot 38.

Figure 8A:
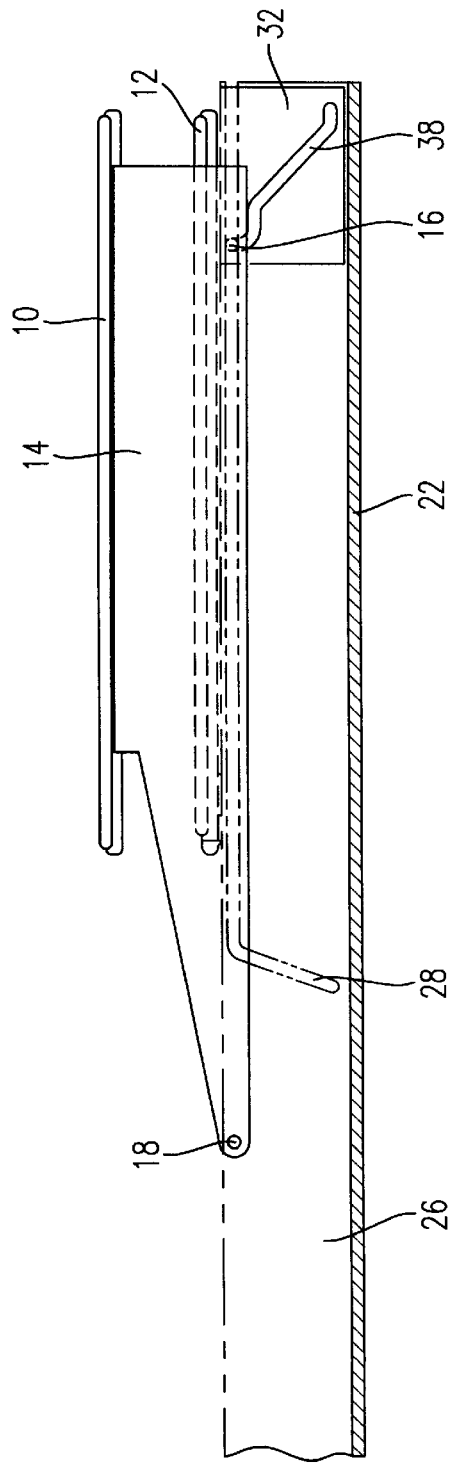
FIGS. 8a and 8b show the sliding roof system of FIGS. 5a and 5b in a fully open position.
Figure 8B:
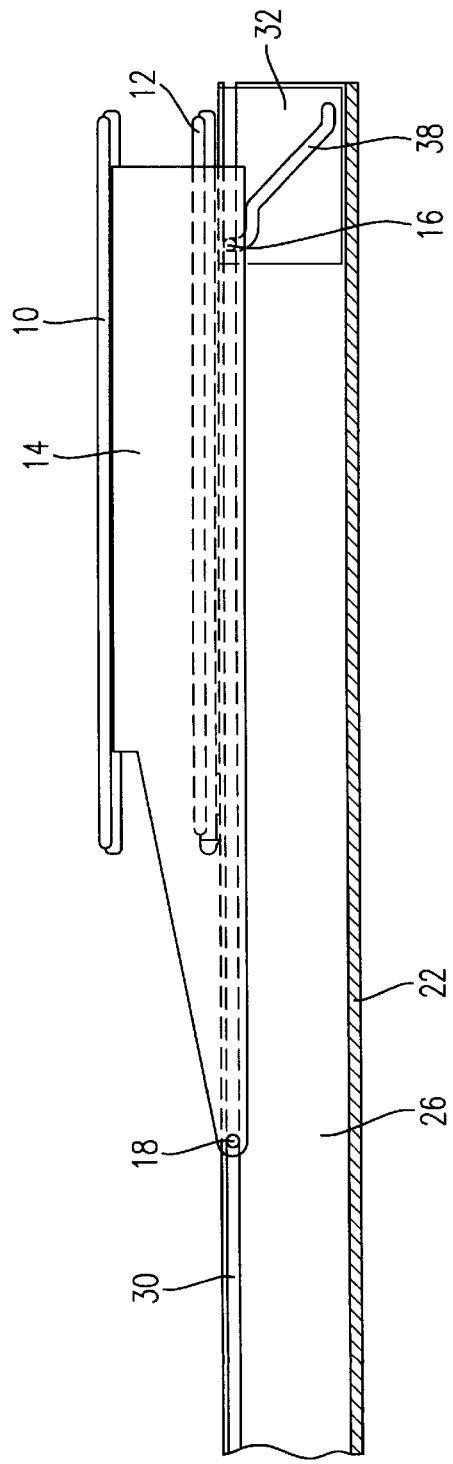

If starting from the position shown in FIGS. 7a and 7b the carriage 32 is moved further to the right, the first cover part 10 will reach its fully opened position shown in FIGS. 8a and 8b, in which it lies above the second cover part 12. This position may be determined, for instance, in that the carriage 32 rests on a stop at the rear end of the guide rail.

In order to lead back the cover part 10 into the closed position, the carriage is shifted to the left with respect to the Figures, i.e. towards the front as seen in the direction of travel. In so doing, the cover part 10 is guided by the hook-out pin 16 and the guide pin 18 into its closed position.

As can be seen for instance from FIG. 6a, the hook-out pin 16 and the guide pin 18 are arranged at a very large distance from each other. This gives a particularly high stability to the cover part 10 mounted to the cover support 14. At the same time, the carriage 32 is configured so as to be particularly short, with the result of a compact construction.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A sliding roof system for a motor vehicle, said system comprising:
   at least one cover part;
   a cover support to which said cover part is mounted;
   a guide rail on which a hook-out slot is provided;
   a carriage which can be shifted in said guide rail, an adjustment slot being provided on said carriage and engaged by a hook-out pin which is mounted to said cover support, said hook-out pin also engaging in said hook-out slot, a guide slot being provided on said guide rail and a guide pin being provided on said cover support, said guide pin gliding in said guide slot; and,
   wherein said adjustment slot has a straight intermediate section which extends parallel to the shifting direction of said carriage in said guide rail, said hook-out pin together with said straight intermediate section of said adjustment slot defining a ventilation position of said cover part.

2. The sliding roof system according to claim 1 wherein said hook-out pin is arranged on a side of said cover support and said guide pin is arranged at an opposing side of said cover support.

3. The sliding roof system according to claim 1 wherein a distance between said guide pin and said hook-out pin is larger than a length of said cover part.

4. The sliding roof system according to claim 1 wherein said guide pin is located in front of a front edge of said cover part.

* * * * *